(12) United States Patent
Ariyoshi et al.

(10) Patent No.: US 7,421,249 B2
(45) Date of Patent: Sep. 2, 2008

(54) READ-WRITE PROCESSING APPARATUS AND METHOD FOR RFID TAG

(75) Inventors: Tomonori Ariyoshi, Ayabe (JP); Koyo Ozaki, Ayabe (JP); Koji Sakacho, Kyoto (JP)

(73) Assignee: OMRON Corporation, Kyoto (JP)

( * ) Notice: Subject to any disclaimer, the term of this patent is extended or adjusted under 35 U.S.C. 154(b) by 423 days.

(21) Appl. No.: 11/040,619

(22) Filed: Jan. 21, 2005

(65) Prior Publication Data

US 2005/0170784 A1    Aug. 4, 2005

(30) Foreign Application Priority Data

Jan. 27, 2004  (JP) ............... 2004-018255
Jan. 12, 2005  (JP) ............... 2005-004702

(51) Int. Cl.
*H04B 17/00* (2006.01)

(52) U.S. Cl. ............... 455/67.13; 455/67.14; 455/67.7; 340/10.1; 340/10.2; 340/10.3; 340/10.4; 340/10.5; 340/10.6; 324/500

(58) Field of Classification Search ............. 455/67.13, 455/67.14, 67.7; 342/500; 340/10.1, 10.2, 340/10.3, 10.4, 10.5, 10.6, 500
See application file for complete search history.

(56) References Cited

U.S. PATENT DOCUMENTS

| | | | | |
|---|---|---|---|---|
| 5,550,548 | A * | 8/1996 | Schuermann | 342/42 |
| 6,084,530 | A * | 7/2000 | Pidwerbetsky et al. | 340/10.1 |
| 6,354,493 | B1 * | 3/2002 | Mon | 235/380 |
| 6,566,997 | B1 * | 5/2003 | Bradin | 340/10.2 |
| 6,972,662 | B1 * | 12/2005 | Ohkawa et al. | 340/10.1 |
| 7,012,529 | B2 * | 3/2006 | Sajkowsky | 340/572.1 |
| 7,014,103 | B2 * | 3/2006 | Fernandez | 235/375 |
| 7,088,246 | B2 * | 8/2006 | Fukuoka | 340/572.5 |
| 7,245,220 | B2 * | 7/2007 | Haller et al. | 340/572.1 |
| 7,271,727 | B2 * | 9/2007 | Steeves | 340/572.7 |
| 2002/0127970 | A1 * | 9/2002 | Martinez | 455/41 |
| 2004/0160322 | A1 * | 8/2004 | Stilp | 340/572.1 |
| 2004/0203478 | A1 * | 10/2004 | Scott | 455/70 |
| 2004/0257203 | A1 * | 12/2004 | Maltsev et al. | 340/10.1 |
| 2005/0052279 | A1 * | 3/2005 | Bridgelall | 340/10.1 |
| 2005/0104790 | A1 * | 5/2005 | Duron | 343/745 |

(Continued)

FOREIGN PATENT DOCUMENTS

JP    2000-306065    2/2000

(Continued)

OTHER PUBLICATIONS

Japan patent application No. 2005-004702, Office Action dated Jul. 18, 2006.

*Primary Examiner*—Lana N. Le
*Assistant Examiner*—Amar Daglawi
(74) *Attorney, Agent, or Firm*—Weaver Austin Villeneuve & Sampson LLP

(57) ABSTRACT

A read-write processing apparatus communicates with an RFID tag provided with a semiconductor memory to exchange commands and responses through antenna coils. A condition under which only a carrier wave is transmitted is set prior to a communication with the RFID tag and a level from a reception signal obtained under this condition is extracted as noise level. The extracted noise level is displayed or outputted to an output host apparatus.

5 Claims, 6 Drawing Sheets

U.S. PATENT DOCUMENTS

| | | | |
|---|---|---|---|
| 2005/0121526 A1* | 6/2005 | Stewart et al. | 235/492 |
| 2006/0113373 A1* | 6/2006 | Fernandez | 235/375 |
| 2006/0145855 A1* | 7/2006 | Diorio et al. | 340/572.1 |
| 2006/0280149 A1* | 12/2006 | Kuhl et al. | 370/338 |

FOREIGN PATENT DOCUMENTS

| | | |
|---|---|---|
| JP | 2000306065 | 11/2000 |
| JP | 2005244944 | 9/2005 |

* cited by examiner (1) COMMAND TRANSMISSION (a) CARRIER WAVE (b) COMMAND SIGNAL (c) TRANSMISSION SIGNAL (2) RESPONSE RECEPTION (d) RESPONSE CONTENT (e) LOAD SWITCH (f) RECEPTION SIGNAL (g) BINARY SIGNAL (h) DEMODULATED SIGNAL

RECEPTION SIGNAL → SIGNAL AFTER DETECTION

| PAGE | RESULT OF COMMUNICATION | | | NOISE LEVEL | | |
|---|---|---|---|---|---|---|
| | RAW DATA | BASE 16 | NORMAL? | RAW DATA | BASE 16 | SIZE OF NOISE |
| Page 1 (LAST TIME) | 00000000 | 00 | NORMAL | 00000011 | 03 | SMALL |
| Page 2 (TIME BEFORE) | 00000000 | 00 | NORMAL | 00000100 | 04 | SMALL |
| Page 3 | 00000000 | 00 | NORMAL | 00000111 | 07 | SMALL |
| Page 4 | 00000000 | 00 | NORMAL | 00000101 | 05 | SMALL |
| .. | .. | | | .. | | |
| .. | .. | | | .. | | |
| Page 10 | 00000000 | 00 | NORMAL | 00000011 | 03 | SMALL |
| Page 11 | 01110000 | 70 | ABNORMAL | 01111111 | 7F | LARGE |
| .. | .. | | | .. | | |
| .. | .. | | | .. | | |
| Page 50 | 01110000 | 70 | ABNORMAL | 00000011 | 03 | SMALL |
| Page 51 | 00000000 | 00 | NORMAL | 00000011 | 03 | SMALL |
| .. | .. | | | .. | | |

*FIG. 8*

READ-WRITE PROCESSING APPARATUS AND METHOD FOR RFID TAG

Priority is claimed on Japanese Patent Applications 2004-018255 filed Jan. 27, 2004 and 2005-004702 filed Jan. 12, 2005.

BACKGROUND OF THE INVENTION

This invention relates to a read-write processing apparatus for carrying out non-contact communications with an RFID tag containing a semiconductor memory to read out or write data from or into this memory and a read-write method that is carried out by such an apparatus.

Systems having a memory medium storing various data attached to each article to be transported and being adapted to read and write data from and into this memory medium by wireless communications are coming to be introduced into control sites of cargoes and assembly lines of factories. Such a system is referred to as an RFID (radio frequency identification) system and the aforementioned memory medium to be attached to each article to be transported contains an IC chip containing a semiconductor memory and a communication antenna coil and is commonly referred to as an RFID tag or a non-contact IC tag.

Prior art read-write processing apparatus for an RFID system are structured as a reader-writer having both an antenna part and a control unit inside a same housing structure, as a controller separate from an antenna part or as a controller that contains the transmission-reception circuit and the control part of the antenna part. Both when reading and writing data, prior art read-write processing apparatus are adapted to transmit a command of a specified format to an RFID tag and to receive from the RFID tag a response to this command. When an RFID tag without containing an inner power source is used, an induced electromotive force is generated in the antenna coil on the side of the RFID tag by means of transmission waves from the antenna part such that a control circuit inside the RFID tag will be driven.

With an RFID system as described above, there is a high probability that various kinds of noise will come to be mixed in the communication region for the tag and the antenna part so as to cause communication errors since the system is often introduced in an environment where machines and apparatus of various types are installed. For this reason, it is necessary to carry out test communications prior to actual system operations and to thereby check whether or not the system is in a condition capable of carrying out communications with RFID tags without any trouble.

In view of the above, the present applicant has earlier proposed a read-write processing apparatus provided with a test mode in which a read-write process is carried out and the distance to the tag is adjusted, and a display light is switched on if a communication error occurs. (See Japanese Patent Koho 2,610,897).

By the invention of aforementioned Japanese Patent Koho 2,610,897, the user can conclude that the antenna part and the RFID tag are in a condition for communicating to each other if this display light is not lit. When such an RFID system is put in an actual use in a real situation, however, there is a possibility of a communication error due, for example, to a sudden occurrence of noise, say, because of the operations of surrounding machines. It is difficult to predict, however, when and how such sudden noise may occur and the real situation is that no sufficient measure is being taken against noise.

In view of this, Japanese Patent Koho 9-190518 discloses a method according to which the read-write processing apparatus transmits to the RFID tag a command to request for the transmission of a pseudo random signal and correlation values are obtained with two kinds of reception signals to this command (signals with data arrangement similar to and not similar to that of the transmission signal from the RFID tag). Only if the correlation value C1 with the signal similar to the transmission signal is greater than a first threshold value T1 and the correlation value C2 with the signal not similar to the transmission signal is less than a second threshold value T2, an access is allowed for reading out data.

According to the invention of aforementioned Japanese Patent Koho 9-190518, reliability of communication process can be improved because actual communication can be started only after it is ascertained that the noise level is low. This invention has problems, however, in that the process becomes complicated because special communications must be carried out between the read-write processing apparatus and the RFID tag for checking the status of noise and that the read-write processing apparatus is required to carry out two correlation calculation processes. Under a circumstance where the variations of noise are large, furthermore, although a communication process may be started after it is ascertained that the two correlation values C1 and C2 both satisfy the aforementioned conditions, there may arise a sudden change in the noise and a communication error may result.

Moreover, communication errors are not limited to be caused by noise but may be caused also for reasons other than noise such as a fault in the RFID tag. In the situation of a communication error, prior art systems inclusive of those according to aforementioned Japanese Patents Koho 2,610,897 and 9-190518 are not adapted to check whether or not it was caused by noise.

SUMMARY OF THE INVENTION

It is therefore an object of this invention to make it possible for the user, when a communication error has occurred in a communication process with an RFID tag, to easily ascertain whether this error was due to noise or not.

It is another object of the invention to prevent the occurrence of a communication error with a high level of reliability by stopping the communication or preventing the start of a communication under a condition of a high noise level.

This invention relates to a read-write processing apparatus for communicating with an RFID tag provided with a semiconductor memory to read and write data from and into this semiconductor memory, preferably equipped with a control part comprising a computer. Such a read-write processing apparatus may be formed as a reader-writer having an antenna part for communicating with the RFID tag (inclusive of an antenna coil as well as a transmitter circuit and a receiver circuit for signals) inside a same housing structure but is not so limited. It may be structured as a controller separate from such an antenna part. It may also be structured as a controller that contains the transmitter and receiver circuits of the antenna part.

Since the RFID tag is set so as to operate according to a command from the read-write processing apparatus, reception signals under a condition where no command is being transmitted do not contain any transmission signal from the RFID tag. Thus, the amplitude of variations in the reception signal may be considered to reflect the noise level.

A read-write apparatus according to a first embodiment of this invention was conceived in view of the above and comprises wait condition setting means for setting prior to a communication with the RFID tag a wait condition under which only a carrier wave is transmitted, noise level extracting means for extracting as noise level a level from a reception signal obtained under this wait condition, and reporting means for displaying or outputting this extracted noise level.

The wait condition setting means can cause the antenna part to transmit only the carrier wave by not outputting any data that form a command. The noise level extracting means includes preferably a level extracting circuit (having a detection circuit and an A/D converter circuit) for processing a reception signal, as well as a signal processing part for processing the output from the level extracting circuit. The level extracting circuit is adapted to extract the level of an envelope line of this reception signal by means of its detection circuit. The signal processing part may be structured so as to take in the output from the level extracting circuit for a plural number of times, to obtain their average and dispersion values and to determine the noise level from the results of its calculations.

The wait condition setting means and the signal processing part may be formed by installing a program necessary for their processing into the computer that comprises the aforementioned control part. The level extracting circuit may be provided independently of an ordinary receiver circuit. If the read-write processing apparatus is structured as a controller separate from the antenna part, the level extracting circuit may be contained in the housing structure for the antenna part. In such a case, the level extracting circuit is not contained by the noise level extracting means and the level extracting means may be formed with an input part for taking in the output from the level extracting circuit and the aforementioned signal processing part.

If the reporting means is formed as a displaying means, the noise level may be shown as a numerical value but it may also be shown as an analog display such as a bar graph. The noise level may also be displayed in several steps such as levels 1, 2, 3, etc. Such display means may be set on the surface of a housing structure forming the main body of the read-write processing apparatus.

If the reporting means is formed as outputting means for outputting the noise level to the outside, it may be formed as an output interface of a personal computer or a programmable logic controller (PLC) to a host apparatus. This output need not be digital signals. This may be outputted as an analog signal.

With a structure as described above, a wait period of a specified length can be set before a communication is started as the condition for a start of such a communication with the RFID tag such as the receipt of a command from a host apparatus comes to be satisfied. Thus, the noise level can be extracted during this period and the result of the extracted level can be reported to the user. In the case of a communication error, the user can easily ascertain whether the error is due to noise or not from the noise level that has been reported.

According to a preferred embodiment, the read-write processing apparatus of this invention may further comprise history data memory that stores history data on processes of each time and storing means for storing the extracted noise in the history data memory in correlation with data that indicate success and failure of communication with the RFID tag. With an apparatus thus structured, history data correlating the noise level extracted immediately before the communication of each time with a success or a failure of the communication can be stored. Thus, the user can make use of such history data to recognize the noise level when a communication fails and investigate the cause of the failure in the communication. If data indicative of date are correlated in the history data and a host apparatus stores history of operations of apparatus near the read-write processing apparatus and the RFID tag, for example, the source of noise for a communication error under a condition of high noise level can be estimated from the status of the site at the time of the occurrence of the error. If the history of operations of peripheral apparatus is separately accumulated, in particular, causal relationships between the communication process and the peripheral apparatus may also be estimated and an apparatus that was operating at the time of occurrence of the error may be picked as a candidate to the source of error.

The response returned by the RFID tag to the read-write processing apparatus includes both a portion where the impedance in the tag is switched at a specified frequency and a portion where the impedance switching does not take place. Data that form a response are an arrangement of "1"s and "0"s in a specified order but data are each expressed as a combination of a part where the impedance is switched and a part where the impedance is not switched.

In the reception signal to the response on the side of the read-write processing apparatus, a signal with large changes in the level (hereinafter referred to as the data signal) appears during a period when the impedance is being switched and a signal with small changes in the level (hereinafter referred to as the base signal) appears during a period when the impedance is not being switched. The read-write processing apparatus can separate the data signal and the base signal in the receiving circuit by carrying out a binarization process on the demodulated reception signal but if there is a large level change in the base signal due to noise, the difference between the data signal and the base signal becomes small and a possibility of a communication error arises.

A read-write processing apparatus according to a second embodiment of this invention was conceived in view of the above and comprises signal extracting means for extracting level of a data signal (as defined above) and level of a base signal (as defined above) from a signal being received in a communication process with the RFID tag, calculating means for calculating the ratio or the difference between the levels of the data signal and the base signal, and reporting means for displaying or outputting the result of calculation by the calculating means.

The signal extracting means in the above, like the noise level extracting means of the read-write processing apparatus according to the first embodiment, may include a level extracting circuit and a signal processing part. The signal processing part is preferably adapted to carry out the extraction of signal level while known data are being transmitted from the RFID tag. As for the known data in the above, it is preferable to use the fixed data positioned at the front part of the response. The fixed data in the above, referred to as the start code, are for the purpose of showing that it is a response from the RFID tag, and generally data of a specified number of bits are arranged in a given sequence.

When the signal level of a period during which the start code is being transmitted is extracted, the signal processing part can recognize a period during which a signal corresponding to the start code is being inputted on the basis of an input from the receiver circuit and input the levels of a data signal and a base signal during this period extracted by the level extracting circuit. In this case, the level of the signal extracted from the data signal corresponds to the aforementioned period during which the RFID tag is switching the impedance periodically and the level of the signal extracted from the base signal corresponds to the aforementioned period during which the RFID tag is not switching the impedance periodically. For each of the base signal and the data signal, it is preferable to repeat the sampling for a plural number of times and to determine the signal level on the basis of the average or dispersion value of the sampled values.

The calculating means may be set by installing a program necessary for the control but may be structured as an IC chip incorporating a divider circuit or a subtractor circuit. The reporting means may be structured like the reporting means for the first read-write processing apparatus described above.

With the second read-write processing apparatus described above, a numerical value representing the ratio or difference between the levels of a data signal and a base signal in a signal being received during a communication with the RFID can be obtained and reported to the user. Thus, when there is a communication error, the user can easily determine whether the error was caused by noise or not on the basis of the reported numerical value. When a report is made to the user, it need not be the numerical value itself that should be displayed but may be analog data such as a bar graph.

With the second read-write processing apparatus described above, the level of a signal extracted from a data signal becomes lower as the RFID tag moves farther away from the antenna coil of the read-write processing apparatus but it may be considered that no large change will appear in a signal extracted from a base signal. In other words, it may be thought that the difference in the levels of these two kinds of signals will become smaller as the distance (communication distance) between the antenna coil and the RFID tag becomes greater. Thus, this read-write processing apparatus may be used to check the adequacy of the communication distance from the reported result of the calculation when a test communication is carried out for adjusting the communication distance.

It is preferable to further provide the read-write processing apparatus according to the second embodiment of the invention with communication control means for comparing a numerical value obtained by the calculating means with a specified threshold value and stopping the communication process when the numerical value changes so as to cross the threshold value. Thus, the communication control means can stop the communication process on the basis of the calculations by the calculating means if the numerical value obtained by the calculating means changes so as to cross the threshold value either from above to below or from below to above. If the calculating means is adapted to divide the level S extracted from a data signal by the level N extracted from a base signal, for example, the communication process can be stopped when the ratio S/N thus obtained changes from a value greater than the threshold value to a smaller value than the threshold value because the ratio becomes smaller as the value of N increases.

This communication control means, too, can be set by installing a program necessary for the control. The communication process can be stopped by this means when a large noise occurs suddenly and hence the occurrence of a communication error due to such noise can be prevented. It is preferable to arrange such that a stopped communication process will be restarted after the elapse of a specified length of time.

It is also preferable to further provide the read-write processing apparatus according to the second embodiment of the invention with history data memory that stores history data on processes of each time and storing means for storing the result of calculation by the calculating means in the history data memory in correlation with data that indicate success and failure of communication with the RFID tag. This memory and the storing means may be similar to those described above for introducing to the read-write processing apparatus according to the first embodiment of the invention. Thus, the user can estimate the source of noise that caused a failure in a communication by analyzing these history data.

A read-write processing apparatus according to a third embodiment of this invention is characterized as comprising wait condition setting means for setting a wait condition prior to a communication with the RFID tag, only a carrier wave being transmitted under this wait condition, noise level extracting means for extracting as noise level a level from a reception signal obtained under the wait condition, and communication control means for discontinuing the wait condition and starting a communication with the RFID tag after a condition in which the noise level remains smaller than a specified value has continued for a specified length of time.

The wait condition setting means and the noise level extracting means in the above may be similar to those comprising the read-write processing apparatus according to the first embodiment of the invention described above. It is preferable in the above, however, to make the wait condition to last not for a fixed length of time but for an adjustable length of time. In particular, it is preferable to make it adjustable such that a clock that measures the time is reset to zero when the noise level becomes greater than the aforementioned specified value and the wait condition lasts until the condition with a low noise level has continued for a specified length of time. In this way, the start of a communication process can be made to wait until a condition with a stable noise level is regained and the occurrence of a communication error can be prevented. The communication control means of this embodiment can also be set by installing a necessary program in the control part as in the case of the read-write processing apparatus according to the second embodiment of the invention.

The invention also relates to a method of communicating with an RFID tag provided with a semiconductor memory to read and write data from and into the semiconductor memory. A method according to a first embodiment of this invention comprises the steps of setting a wait condition prior to a communication with the RFID tag, only a carrier wave being transmitted under this wait condition, extracting as noise level a level from a reception signal obtained under the wait condition, and displaying or outputting the extracted noise level. This method may be interpreted as the method carried out by the read-write processing apparatus according to the first embodiment of the invention described above although these steps can be carried out by different devices. For example, the read-write processing apparatus may be used for the first two steps and the third step may be carried out by a personal computer or the like.

A method according to a second embodiment of this invention comprises the steps of extracting level of a data signal and level of a base signal from a signal being received in a communication process with the RFID tag, the data signal and the base signal respectively corresponding to a period during which the RFID tag switches and does not switch impedance periodically, calculating the ratio or the difference between the levels of the data signal and the base signal, and displaying or outputting the result of calculation by the calculating means. This method may be interpreted as the method carried out by the read-write processing apparatus according to the second embodiment of the invention described above although these three steps may each be carried out by a different device. For example, the first step may be carried out by the read-write processing apparatus to output the two signal levels to another device such as a personal computer such that the second step and the third step may be carried out by such other device.

By this invention, since the user is informed of the noise level when a communication is carried out with the RFID tag, the user can easily ascertain at the time of a communication error whether or not it is caused by noise. Moreover, if the noise level is high after a communication with the tag, the subsequent communication process may be stopped and it may be restarted again after a condition of a low noise level lasts for a specified length of time. Thus, the occurrence of a communication error can be prevented with a high level of reliability and a communication process can be carried out in a stable manner.

BRIEF DESCRIPTION OF THE DRAWINGS

FIG. 8 is a table showing an example of history data that may be stored in the reader-writer.

DETAILED DESCRIPTION OF THE INVENTION

Figure 1:
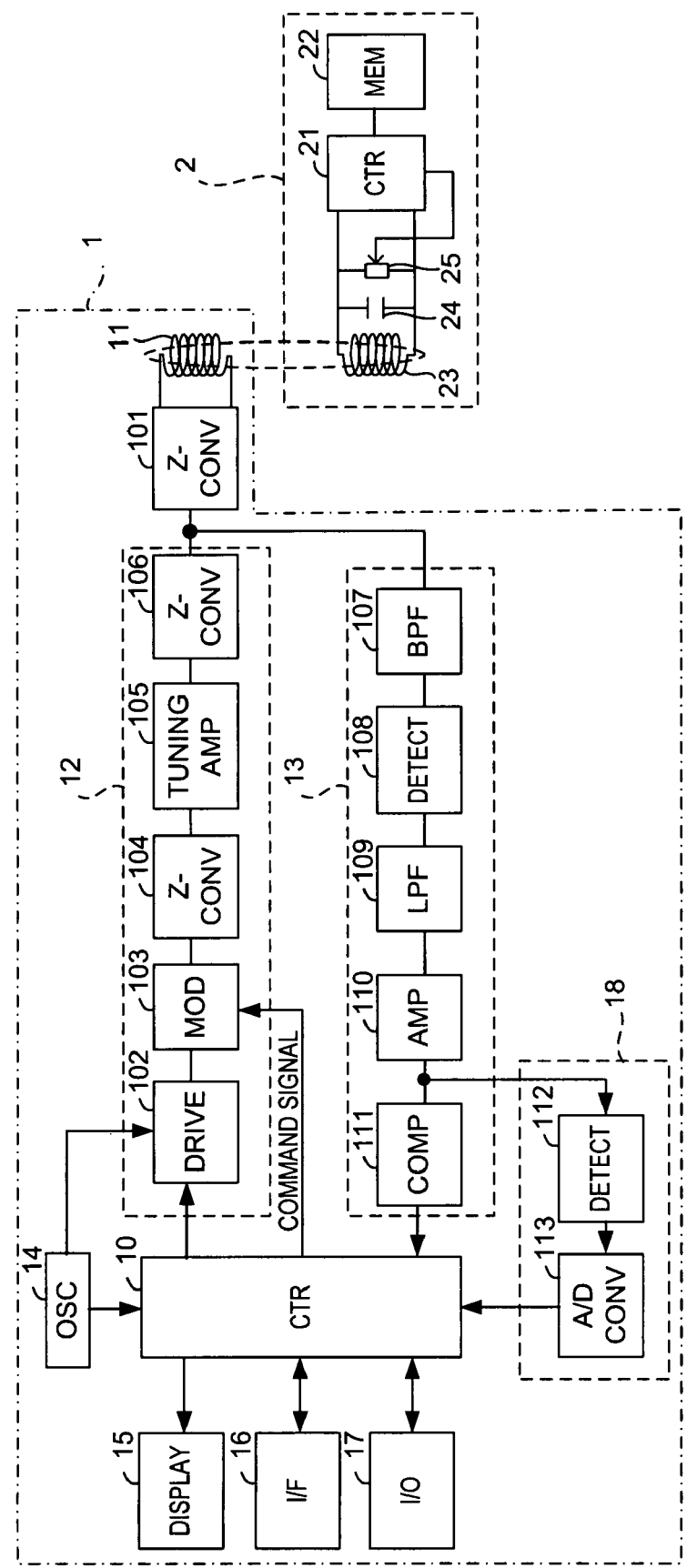
FIG. 1 is a block diagram showing the structure of a reader-writer of this invention and a RFID tag with which it carries out communications.

FIG. 1 is a block diagram showing the structure of a reader-writer 1 embodying this invention and an RFID tag (hereinafter referred to simply as a tag) 2 as its object of communication. The tag 2 in this example does not contain a power source, being of the type that operates by an induced electromotive force generated by transmitted waves from the reader-writer 1, and is provided with a control part 21 and a semiconductor memory 22. The tag 2 also comprises an antenna coil 23, a capacitor 24 and a load switch 25 (a resistor with a contact point, according to this example) for communication. The control part 21 of this tag 2 includes not only a computer but also peripheral circuits such as a demodulation circuit for demodulating transmitted signals from the reader-writer 1.

The reader-writer 1 is formed with a control part 10, an antenna coil 11, a transmitter circuit 12, a receiver circuit 13, an oscillator circuit 14 and a Z conversion circuit 101 for a matching process on the antenna coil 11 placed inside a housing structure (not shown). This housing structure is further provided with a display part 15, an interface (I/F) circuit 16, an input-output (I/O) circuit 17 and a level extracting circuit 18.

The control part 10 on the side of the reader-writer 1 is a computer and carries out communication processing with the tag 2 according to a program stored in an internal memory. This control part 10 is also adapted to output high-frequency pulses based on pulse signals from the oscillator circuit 14. The high-frequency pulses become the basis of a carrier wave. When communicating with the tag 2, the control part 10 also serves to output, as a pulse signal, data that represent the content of a command. This output pulse signal is also referred to as a command signal.

The transmitter circuit 12, referred to above, includes a driver circuit 102, a modulator circuit 103, a tuning-amplifying circuit 105 and a pair of Z conversion circuits 104 and 106 sandwiching this tuning-amplifying circuit 105. The receiver circuit 13 includes a bandpass filter (BPF) circuit 107, a detection circuit 108, a low pass filter (LPF) circuit 109, an amplifier circuit 110 and a comparator circuit 111. The aforementioned command signal is transmitted from the control part 10 to the modulator circuit 103.

The aforementioned display part 15 comprises a numerical displayer and a plurality of display lights (not shown) and may be at an appropriate position on the housing structure. The interface circuit 16 is used for communication with host apparatus (not shown) such as personal computers and PLCs. The input-output circuit 17 is used for taking in external signals and outputting results of processing.

The level extracting circuit 18 is for taking out the level of the reception signal as digital data and is formed with a detector circuit 112 and an A/D converter circuit 113.

Figure 2:
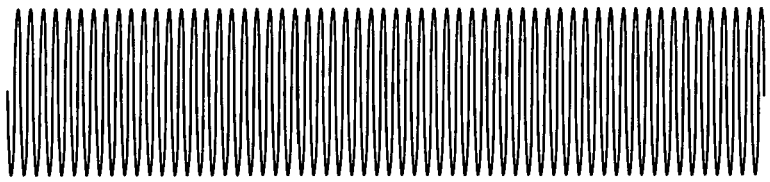
FIG. 2 is a timing chart for the signals related to the transmission and reception by the reader-writer.
Figure 2:
Figure 2:
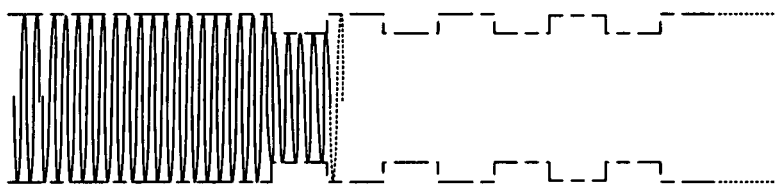
Figure 2:
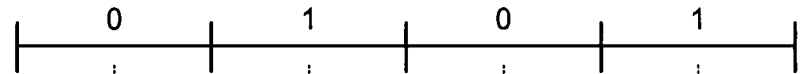
Figure 2:
Figure 2:
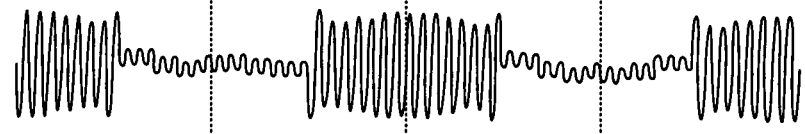
Figure 2:
Figure 2:

FIG. 2 is a timing chart for the signals related to the transmission and reception by the reader-writer 1 described above. FIG. 2(1) shows the signals related to the command transmission to the tag 2 and FIG. 2(2) shows the signals related to the reception of a response.

In FIG. 2(1), (a) shows the aforementioned carrier wave. In the illustrated example, its frequency is set as 13.56 MHz. In FIG. 2(1), (b) shows a command signal. According to the illustrated example, it is a pulse width modulated signal of data of each bit comprising a command with "1" showing the low level and "0" showing the high level.

The modulator circuit 103 uses the command signal to modulate (ASK modulation) the carrier wave to generate a transmission signal (c). According to the illustrated example, ASK modulation with degree of modulation 10% is carried out. The generated transmission signal is provided to the antenna coil 11 after undergoing an amplification process by the tuning-amplifying circuit 105 and an impedance matching process by the Z conversion circuits 104, 106 and 101 and transmitted to the tag 2 as electromagnetic waves.

As the control part 21 of the tag 2 demodulates the transmission signal from the reader-writer 1 and recognizes the contents of the command, it carries out a process corresponding to this command and generates a response that shows the results of this process. In order to return this response, the control part 21 switches the load switch 25 on and off on the basis of the data arrangement as shown in (d) and (e) of FIG. 2(2). In this example, the length of time for transmitting a bit of signal is set equal to the time necessary to repeat the switching on and off of the load switch 25 sixteen times. If the data item to be transmitted is "0", the load switch 25 is switched on and off eight times during the first half of the aforementioned length of time and the load switch 25 remains switched off during the second half. If the data item to be transmitted is "1", on the other hand, the load switch 25 is kept switched off during the first half and the load switch 25 is switched on and off eight timed during the second half of the period.

When the reader-writer 1 and the tag 2 are in a relationship where communication is possible, their antenna coils 11 and 23 are in an electromagnetically coupled condition. Thus, as the impedance of the tag 2 is periodically changed by the switching of the load switch 25 on and off, the impedance of the reader-writer 1 also changes accordingly, causing also the current that flows through its antenna coil 11 to change. The receiver circuit 13 serves to detect from this change a signal that represents the aforementioned response, eliminating noise by means of the bandpass filter circuit 107 and thereafter extracting by means of the detection circuit 108 the carrier wave that has been affected by the aforementioned changes in impedance. After the frequency components of the carrier wave are further eliminated by means of the low pass filter circuit 109, an amplification process is carried out by means of the amplifier circuit 110 such that a reception signal (f) as shown in FIG. 2 is detected. The frequency of the reception signal (f) after the frequency component of the carrier wave is removed is 424 KHz.

The reception signal corresponding to the period during which the load switch 25 is switched on and off (data signal) includes waves which have an amplitude greater than a specified value and change in synchronism with this switching. Waves with an amplitude greater than the specified value also appear due to noise in the environment in the reception signal while the load switch 25 is maintained in the off-condition (base signal).

The comparator circuit 111 compares the amplitude of this reception signal with a specified reference level and generates a binary signal (g) in FIG. 2. By this binarization process, a signal change corresponding to the switching of the load switch 25 is extracted. The control part 10 partitions this binary signal (g) in units of bits and thereby obtains a demodulated signal (h), demodulating the data of the individual bits.

Figure 3:
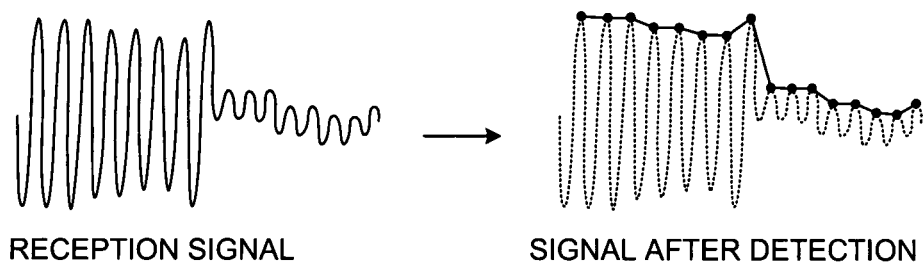
FIG. 3 shows an example of detection process carried out by the level extracting circuit.

The detection circuit 112 of the level extracting circuit 18 takes in the reception signal (f) of FIG. 2 and extracts an envelope that includes each peak of the reception signal as shown in FIG. 3. This envelope signal is converted into a digital signal by means of the A/D converter circuit 113 and inputted to the control part 10. The control part 10 makes use of this input from the level extracting circuit 18 to obtain information indicative of the noise level immediately before and during a communication and carried out a process of reporting this to the user.

Figure 4:
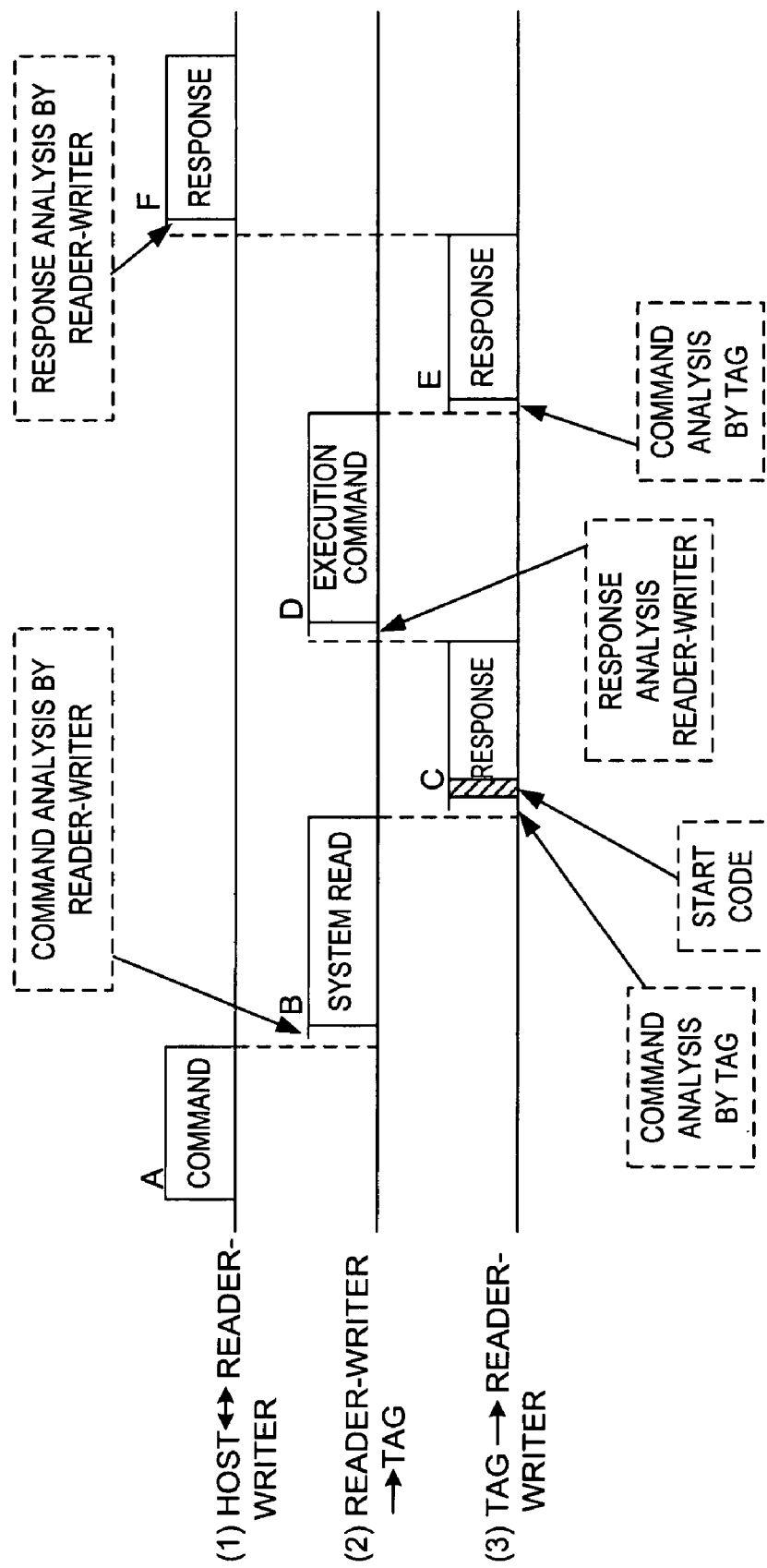
FIG. 4 is a timing chart for showing the flow of communication processes among the reader-writer, the tag and a host apparatus.

The reader-writer 1 starts a communication with the tag 2 as it receives a command (such as a read command or a write command) from a host apparatus and provides the tag 2 with a similar command. As the tag 2 carries out a process according to this command and returns a response, the reader-writer 1 transmits this response back to the host apparatus. In general, a plurality of tags 2 are sent into the communication region of the reader-writer 1 sequentially at specified intervals. Each tag stops at a position opposite the reader-writer 1 for a specified length of time during which a communication process is carried out according to a flow as shown in FIG. 4. The arrival of a tag 2 at the opposite position of the reader-writer 1 is detected by means of a sensor (not shown). The host apparatus inputs its detection signal and outputs a command to the reader-writer 1.

The size of the communication region is determined based on the range in which power necessary for communication with the tag 2 can be induced. When the tag 2 enters this communication region, it comes to be in the condition capable of responding to a command from the reader-writer 1.

FIG. 4 shows this flow of communications among the reader-writer 1, the tag 2 and a host apparatus. Line (1) shows the signals exchanged between the host apparatus and the reader-writer 1, Line (2) shows the signals transmitted from the reader-writer 1 to the tag 2, and Line (3) shows the signals transmitted from the tag 2 to the reader-writer 1. The portions shown by dotted lines indicate periods during which data are being processed (command analysis or response analysis) by the reader-writer 1 or the tag 2. Whether it is a command analysis or a response analysis that is being carried out is also indicated.

In what follows, the flow of basic data processing for the tag 2 will be explained with reference to reference symbols A, B, etc. of FIG. 4. Firstly, the host apparatus generates a command showing processes to be carried out by the tag 2 and transmits it to the reader-writer 1 (A). After analyzing the content of this command, the reader-writer 1 transmits to the tag 2 a first data readout command (B). In the above, the first data readout is for the purpose of acknowledging the fixed data such as the identification data of the tag 2 and is commonly referred to as the "system read".

While this system read is being carried out, the tag 2 receives signals of the system read through the antenna coil 23 which is electromagnetically coupled to the antenna coil 11. After acknowledging and analyzing the system read command, the tag 2 generates a response including specified data and returns it to the reader-writer 1 (C).

The beginning portion (shown with a hatching) of this response (C) contains a fixed data arrangement of several bits. This portion is for indicating that the data which follow are the response from the tag 2 to this system read and is referred to as the "start code".

While this response (C) is being transmitted, the reader-writer 1 receives signals of this response through the antenna coil 11 electromagnetically coupled to the antenna coil 22. The reader-writer 1 analyzes the content of the received response and if it is judged to be a normal response, a second command is transmitted to the tag 2 (D). The purpose of this second command is to provide the tag 2 with the content of the command (A) from the host apparatus and to thereby cause this command to be executed. Thus, this command is hereinafter referred to as the execution command. After, analyzing this execution command and executing the process corresponding to its content, the tag 2 generates a response that indicates the details of the process and returns it to the reader-writer 1 (E). Upon recognizing that the response from the tag 2 is normal, the reader-writer 1 transmits it to the host apparatus (F).

In the reception signal detected by the receiver circuit 13, as shown in FIG. 2, there is a big difference between the data signal corresponding to a period when a data communication from the tag 2 is being carried out (when the load switch 25 is being repeatedly being switched on and off) and the base signal while no data communication is taking place (while the load switch 25 is maintained in the switched-off condition) and hence the transmission data from the tag 2 can be correctly demodulated by a binarization process. If large noise appears suddenly during a communication process with the tag 2, however, a level change exceeding the binarization threshold value may appear in the base signal and there is a possibility that the transmission data cannot be demodulated correctly.

In view of this problem, the reader-writer 1 is provided with the function of reporting on the level of noise that may be present at the time of communication processing. In what follows, two examples of this reporting function will be described sequentially.

According to the first example, the level of the signal extracted by the level extracting circuit 18 is checked before the communication with the tag 2 is commenced and under the condition where the tag 2 is not inside the communication region of the reader-writer 1. Since the aforementioned carrier wave is constantly being transmitted independently of the communication with the tag 2, the changes in the level of the reception signal when the tag 2 is not inside the communication region and is not engaged in any communication should be reflecting the condition of the noise. Since the level extracting circuit 18 is adapted to extract the level when the reception signal shifts in the higher direction, it can extract the level reflecting the size of noise when no communication is being carried out. In what follows, the level which is extracted by the level extracting circuit 18 under the condition where no communication is being carried out will be referred to as the noise level. The control part 10 carries out the process of sampling the noise level a plural number of times before a communication is carried out, calculates an average value of the sampled values and causes it to be displayed on the display part 15.

Figure 5:
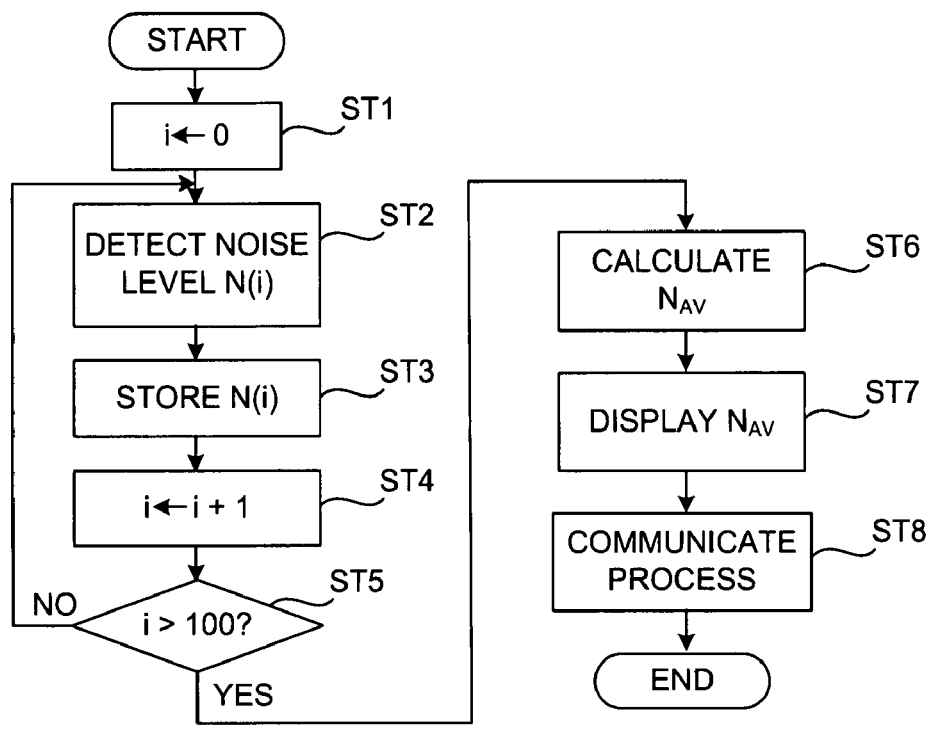
FIG. 5 is a flowchart of a control routine for obtaining the noise level before the communication process.

FIG. 5 is a flowchart showing a detailed control routine by the reader-writer 1. In FIG. 5, N(i) indicates an arrangement for storing the sampled values of noise level.

This routine is started as a command (A) is received from a host apparatus and the counter i is initially set to zero (Step ST1). Thereafter, in the loop of Steps ST2-ST5, input data from the level extracting circuit 18 are taken in (Step ST2) for a specified number of times (100 times in the illustrated example) and each of these inputted values is stored in a memory as noise level N(i) (Step ST3). After all these noise level values are inputted (YES in Step ST5), the average value $N_{av}$ of these 100 noise level values N(i) is calculated (Step ST6) and displayed by the display part 15 (Step ST7). The display part 15 may be adapted to display the numerical value of this average $N_{av}$ itself or to use a bar graph to make a display in comparison with a specified threshold value.

After the series of processes described above has been completed and the tag 2 has entered the communication region of the reader-writer 1, the series of communications with the tag 2 as shown in FIG. 4 is started (Step ST8). The aforementioned display of the average value $N_{av}$ is continued until the communication process is completed or even until the next command is received from the host apparatus after the communication process is completed such that the user will have sufficient time to notice the display. In the case of the occurrence of a communication error, not only it is reported by means of an alarm but also the display of the average value $N_{av}$ is continued for a specified length of time.

By a control as described above, the user can be informed of the level of noise that is being generated immediately before each of the communication processes. Especially when a communication error has occurred, the user can easily determined whether this error was a result of noise or not.

The second of the examples to be described next is for processing a reception signal being exchanged between the tag 2 after the tag 2 has entered the communication region of the reader-writer 1 and has started a communication process. Explained in detail, this is done by taking note that the aforementioned start code is included at the beginning of the response from the tag 2, extracting the rate of level change in the reception signal corresponding to this start code a signal-to-noise (SN) ratio and causing it to be displayed by the display part 15.

Figure 6:
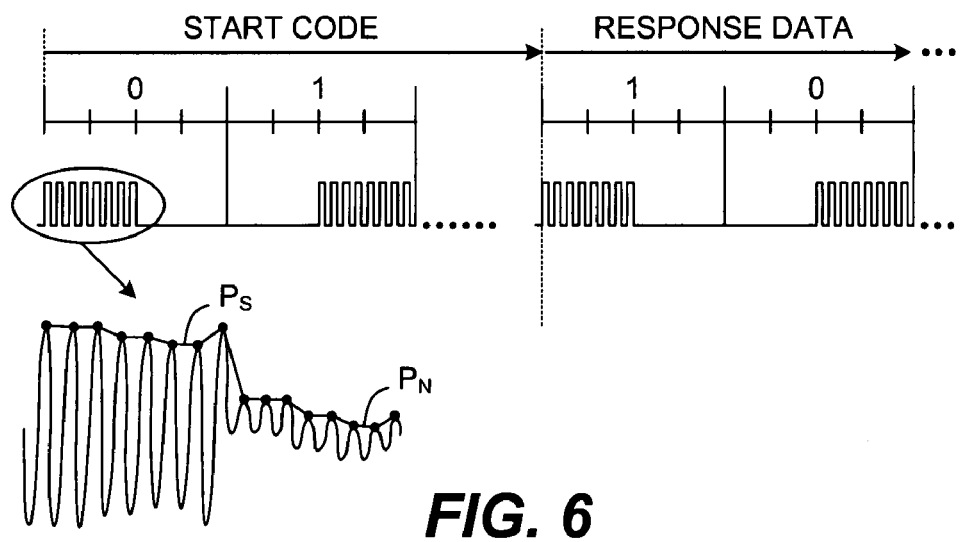
FIG. 6 is a drawing for showing an example of signal processing on the start code.

FIG. 6 shows an example of this signal processing on the start code. The timing chart in FIG. 6 shows the correspondence between a portion of data contained in the response from the tag 2 and the on/off operations of the load switch 25. The portion of the reception signal on the side of the reader-writer 1 corresponding to data item "0" of this response is shown enlarged. This also shows a level change reflecting the on-off operations of the load switch 25. In other words, this level change is extracted by using the envelope signal extracted by the level extracting circuit 18.

Since the data arrangement of the start code is known, the control part 10 can separate this reception signal into a portion that corresponds to the aforementioned data signal and another portion that corresponds to the base signal by comparing between the data arrangement of the reception signal binarized by the comparator circuit 111 of the receiver circuit 13 and the aforementioned known data arrangement. According to this example, while a signal corresponding to the start code is being received, the envelope signal extracted by the level extracting circuit 18 is separated into signal $P_S$ corresponding to the data signal and signal $P_N$ corresponding to the base signal, the average value of signal $P_S$ is treated as the signal level S, the average value of signal $P_N$ is treated as the noise level N and their ratio is calculated.

Figure 7:
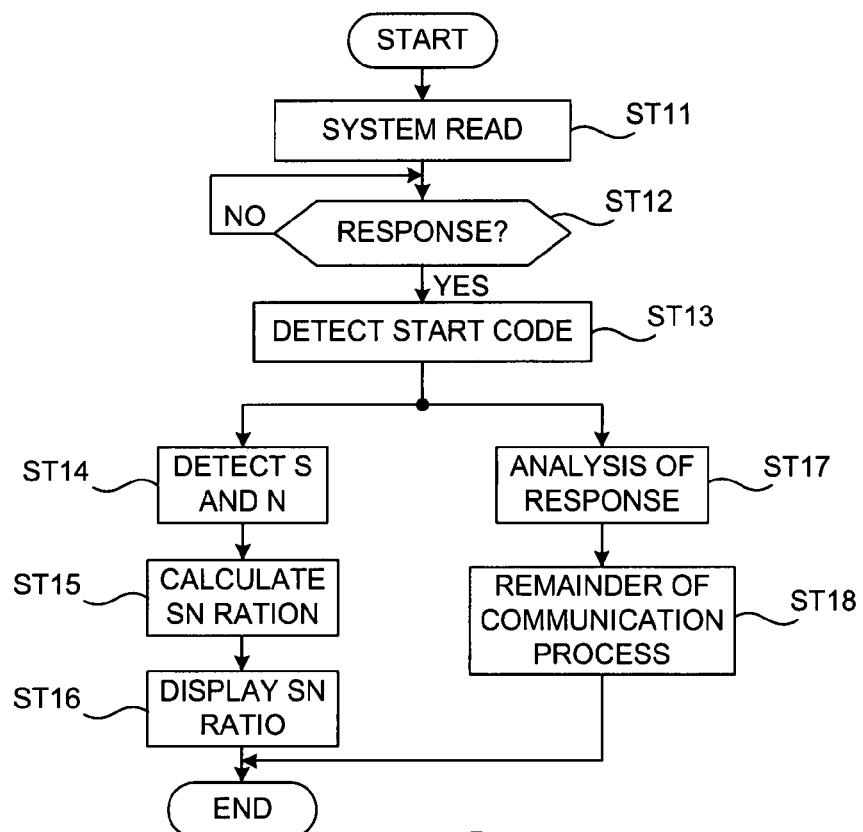
FIG. 7 is a flowchart of a control routine for obtaining a signal-to-noise ratio during communication by the processing of FIG. 6.

FIG. 7 shows the routine according to the second example. This routine is also started as a command is received from a host apparatus, and a command for the aforementioned system read is transmitted to the tag 2 (Step ST11). After a response to this command is received from the tag 2 (or when the starting bit of the start code of this response is recognized) (YES in Step ST12), the process of detecting the start code as a whole is continued (Step ST13). In this step, the data arrangement corresponding to the start code is recognized on the basis of the binary signal from the comparator circuit 111. At the same time, the output from the level extracting circuit 18 corresponding to the start code is taken in while it is separated into aforementioned signals $P_S$ and $P_N$ and storing them in a memory (not shown).

After the start code is thus detected, the processing of Steps ST14-ST16 and that of Steps ST17 and ST18 are carried out in parallel.

In Step ST14, average values of signal levels that have been accumulated separately for signals $P_S$ and $P_N$ extracted in Step ST13 are obtained to determine signal level S and noise level N as defined above. The SN ratio is calculated by dividing the noise level N by the signal level S (Step ST15) and is displayed by the display part 15 (Step ST16).

In Step S17, on the other hand, the substantial content of the response is obtained from the portion of the reception signal after the start code detected in Step ST13 and this content is analyzed. Thereafter, the remainder of the communication process such as the transmission of the execution command, the reception of a response from the tag 2 to this command and the transfer of this response to a host apparatus is carried out (Step ST18). In this example, too, the display of the SN ratio is continued until the process of Step ST18 is completed or until a next command is received from the host apparatus. In the case of the occurrence of an error, an alarm is outputted to report it and the display of the SN ratio is maintained for a specified length of time.

By this second example, since the SN ratio can be displayed during a communication process, the user can ascertain the level of noise that is being generated while carrying on the communication process. In the case of a communication error, in particular, it can be ascertained easily whether this error was caused by noise or not from the displayed SN ratio. As a variation of the second example, the difference between the signal level S and the noise level N may be obtained instead of their ratio.

Although it was explained above that Steps ST14-ST16 and Steps ST17 and ST18 are carried out in parallel, the step of analyzing the response (Step ST17) and the step thereafter may be carried out after the SN ratio has been obtained. In such a case, the routine may be so arranged that the step of analyzing the response (Step ST17) and the steps thereafter are stopped if the calculated SN ratio happens to exceed a specified threshold value. Since communications under a condition of large noise can thus be avoided in this manner, communications can be carried out successfully with a higher level of reliability. After the communication process is thus stopped, it is preferable to restart the same routine from the beginning after a specified length of time has elapsed.

By both of the examples described above, communication processes can be carried out by sending tags 2 sequentially into the communication region of the reader-writer 1 and noise level and SN ratios can be calculated and displayed on the display part 15 between or during these processes. The selection between the two examples may be made, depending upon the time difference between when a tag which has completed its communication leaves the communication region of the reader-writer 1 and when the next tag arrives in the communication region and the processing time assigned to each tag. If this time difference is sufficiently long, the first example may be used. If this time difference is small, the second example may be used.

The control according to either of the examples may be carried out not only during a real operation but also during a preliminary test period. In such a case, the user can estimate the level of noise that is likely to be generated from the display of either the noise level or the SN ratio such that the environment can be rearranged if this level is found to be too high. Since the signal level is expected to become lower as the tag 2 is separated from the reader-writer 1 farther away especially in the case of the second example, the distance between the reader-writer 1 and the tag 2 can be adjusted on the basis of the displayed SN ratio.

Each of the examples described above was designed such that the communication process is carried out after the tag 2 entering the communication region of the reader-writer 1 is stopped but there are cases where the communication process is carried out while the tag 2 is in motion. In such a case, the reader-writer 1 carries out the aforementioned system read repeatedly until a response is obtained from the tag 2 and transmits the execution command if a response is obtained from the tag 2, concluding that it has become possible to communicate with the tag 2. When the first of the examples described above is applied to such a case, the process of detecting the noise level is carried out immediately before every system read such that, at the point in time when a response from the tag 2 is obtained to a system read, the noise level which was obtained immediately before or the average value of noise levels obtained by a plurality of detection processes in the recent past may be displayed. In the case of the second example, the noise level may be detected after a response is obtained from the tag 2 and a routine which is similar to the one according to FIG. 7 but in which the system read is repeated may be carried out.

The noise level and the SN ratio obtained as explained above may be outputted to a host apparatus instead of being displayed. In such a case, the host apparatus will be able to carry our controls such as displaying the transmitted data from the reader-writer 1, determining the size of noise and outputting an alarm in the case of a large noise. The reader-writer 1 may be adapted to create history data by correlating the calculated results of noise level and SN ratio each time with the results of the communication process and to store them in a memory.

FIG. 8 shows an example of such history data, correlating the results of each communication process with the noise level measured immediately before that communication result. These noise levels are values measured before the communication process is started and under the condition where the tag 2 is not inside the communication region of the reader-writer 1, similar to the first example described above. For the measurement of these noise levels, a routine similar to Steps ST1-ST6 of FIG. 5 may be repeated for a plural number of cycles but it is preferable to adopt as the history data the noise levels measured immediately before a communication process.

In this example, data related to each of communication processes are collected as a page and each page is assigned a number (page number) indicative of the cycle (how many cycles before) in which the data were obtained in the communication process. The page number is 1 for the communication process carried out immediate before and is increased as the time goes farther back. In other words, every time a communication process is carried out, the number of the page related to the communication process immediately before is set to 1 and the numbers of older pages are incremented by 1.

Each page contains not only data read out of the tag 2 as data showing the results of a communication but also data item "normal" or "abnormal" to indicate whether the communication process was successful or not. In this example, it is so arranged that in the case of a failure in the communication a retry (the process of repeating the same communication again) can be carried out up to a predetermined number of times and if the communication succeeds by a retry, the data item showing the result will say "normal". If the communication does not succeed after the retry is repeated for the predetermined number of times, the result is shown as "abnormal". Explained more in detail, the data items "normal" and "abnormal" are expressed by a flag. Although not shown in FIG. 8, the number of times a retry was repeated may also be included in the result of communication.

Although the data read out from the tag 1 are 8-bit data, data with the upper 4 bits and the lower 4 bits separated are also stored in order to show them as hexadecimal data ("base 16"). In the example of FIG. 8, the original 8-bit data are shown as "raw data" and the upper and lower 8-bit data are shown in hexadecimal notation.

For noise level, too, not only raw data in 8 bits but also data in hexadecimal notation ("base 16") are stored in order to show the upper and lower 4-bit portions separately. The noise level is also shown in terms of being "large" or "small" and this determination is shown in the table. This determination may be made by comparing the calculated noise level with a specified threshold value. In addition to "large" and "small", another classification "medium" may also be introduced to indicate that the noise level is somewhere between "large" and "small". These results of determination are also indicated by means of a flag.

The reader-writer 1 is adapted to transmit the history data to a host apparatus in response to a call command therefrom. The host apparatus may display the transmitted history data on a display device or carry out a process of printing them out such that the user can analyze the cause of a communication error in detail from such outputted history data.

From the data shown in FIG. 8, for example, it may be concluded that a communication error occurred because of noise in the communication process corresponding to page number 11 and that the communication error in the communication process corresponding to page number 50 was not because of noise but was due to some other cause such as an inadequate position of the tag 2 or a fault in a circuit on the side of the tag 2. If history data of operations of apparatus set near the reader-writer 1 are stored (say, by a host apparatus), the cause of occurrence of noise may be analyzed on the basis of the conditions of operations of such other apparatus when there is a communication error due to noise. If it is found that there is a high probability that a certain apparatus is in operation at the time of occurrence of a communication error, it may be predicted that this apparatus is the cause of noise and a proper measure may be taken to reduce the noise.

Figure 9:
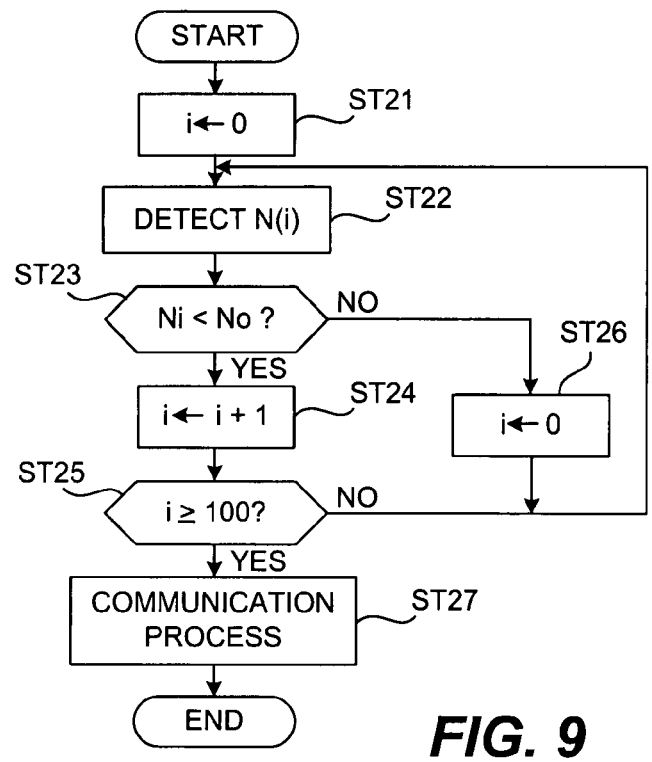
FIG. 9 is a flowchart of a control routine for starting a communication process upon ascertaining that the noise level is low.

The first example shown in FIG. 5 was explained above as detecting a noise level before the start of a communication, reporting its result and always restarting the communication after the elapse of a certain specified length of time. Instead, it may be arranged to wait until the noise level becomes low if it is found to be above a specified threshold value. FIG. 9 shows a control routine for such an arrangement.

The routine according to FIG. 9 is also started as a command is received from a host apparatus. At the start of this routine, the counter i for counting the sampling number of noise level is set to zero (Step ST21) and the output value from the level extracting circuit 18 is detected and stored as the noise level N(i) (Step ST22). If this value is less than a specified threshold value $N_0$ (YES in Step ST23), the counter i is incremented by 1 (Step ST24). If N(i) is not less than the threshold value $N_0$ (NO in Step ST23), the counter i is reset to zero (Step ST26). The above is repeated until the counter value i reaches 100, or until all of 100 consecutively sampled noise levels are found to be below the specified threshold value $N_0$ (YES in Step ST25) and it is only then that the communication process is started (Step ST27). By this routine, a communication error due to noise can be avoided with a high level of reliability.

The example described above with reference to FIG. 9 is somewhat similar to the prior art disclosed in aforementioned Japanese Patent Koho 9-190518 in that communications are started only after it is ascertained that noise level is low. According to the prior art technology of Japanese Patent Koho 9-190518, however, it is necessary to carry out a communication with the tag in order to check the noise level and two correlation calculations must be performed in order to check the noise level. According to the present invention, by contrast, the process is not complicated because only the noise level is checked and there is no particular need to carry out any communication with the tag.

Moreover, the technology according to Japanese Patent Koho 9-190518 does not require that the condition of a low noise level should continue for a specified length of time. Although the noise level may happen to be low some time before the start of a communication, noise level may suddenly rise thereafter to cause a communication error. According to the example shown in FIG. 9, by contrast, a communication process is not started unless the condition of low noise level lasts for a specified length of time. Thus, communications are be started under a more reliably stable condition and it is much less likely that the noise level will rise suddenly during a communication. In other words, communication errors caused by noise can be avoided much more reliably.

What is claimed is:

1. An apparatus for communicating with an RFID tag provided with a semiconductor memory to read and write data from and into said semiconductor memory, said apparatus comprising:

signal extracting means for comparing, while known data are being transmitted from said RFID tag in a communication process with said RFID tag, said known data and a base signal being received and thereby extracting a known data signal level corresponding to a period during which said RFID tag switches impedance periodically and another base signal level corresponding to another period during which impedance is not switched periodically;

calculating means for calculating the ratio or the difference between the levels of said known data signal and said base signal; and reporting means for displaying or outputting result of calculation by said calculating means.

2. The apparatus of claim 1 further comprising communication control means for comparing a numerical value obtained by said calculating means with a specified threshold value and stopping said communication process when said numerical value changes so as to cross said threshold value.

3. The apparatus of claim 1 further comprising:

history data memory that stores history data on processes of each time; and storing means for storing the result of calculation by said calculating means in said history data memory in correlation with data that indicate success and failure of communication with said RFID tag.

4. The apparatus of claim 2 further comprising:

history data memory that stores history data on processes of each time; and storing means for storing the result of calculation by said calculating means in said history data memory in correlation with data that indicate success and failure of communication with said RFID tag.

5. A method of communicating with an RFID tag provided with a semiconductor memory to read and write data from and into said semiconductor memory, said method comprising the steps of:

comparing, while known data are being transmitted from said RFID tag in a communication process with said RFID tag, said known data and a base signal being received and thereby extracting a known data signal level corresponding to a period during which said RFID tag switches impedance periodically and another signal level corresponding to another base period during which impedance is not switched periodically;

calculating the ratio or the difference between the levels of said known data signal and said base signal; and displaying or outputting result of calculation by said calculating means.

* * * * *